US008813530B2

(12) United States Patent
Chiou et al.

(10) Patent No.: US 8,813,530 B2
(45) Date of Patent: Aug. 26, 2014

(54) PUSH-BUTTON TYPE CYLINDER LOCK ASSEMBLY

(75) Inventors: Ming-Shyang Chiou, Chiayi (TW); Chia-Min Sun, Chiayi (TW); Yu-Ting Huang, Chiayi (TW); Song-Gen Shyu, Chiayi (TW); Ching-Chuan Kuo, Chiayi (TW)

(73) Assignee: Tong Lung Metal Industry Co., Ltd., Chia-Yi (TW)

( * ) Notice: Subject to any disclaimer, the term of this patent is extended or adjusted under 35 U.S.C. 154(b) by 232 days.

(21) Appl. No.: 13/484,562

(22) Filed: May 31, 2012

(65) Prior Publication Data

US 2012/0304712 A1 Dec. 6, 2012

(30) Foreign Application Priority Data

Jun. 2, 2011 (TW) ............................ 100210018 U

(51) Int. Cl.
*B60R 25/02* (2013.01)
*E05B 55/00* (2006.01)
*E05B 13/10* (2006.01)

(52) U.S. Cl.
CPC ............ *E05B 55/005* (2013.01); *E05B 13/108* (2013.01)
USPC ............................ 70/224; 70/467; 292/336.3

(58) Field of Classification Search
CPC ..... E05B 13/108; E05B 21/06; E05B 55/005; E05B 65/00
USPC ........ 292/336.3; 70/224, 422, 467, 472, 476, 70/480
See application file for complete search history.

(56) References Cited

U.S. PATENT DOCUMENTS

| | | | | |
|---|---|---|---|---|
| 5,816,086 | A | 10/1998 | Russell, IV | |
| 6,099,053 | A * | 8/2000 | Huang | 292/336.3 |
| 6,360,569 | B1 * | 3/2002 | Huang | 70/215 |
| 6,553,799 | B2 * | 4/2003 | Bates et al. | 70/224 |
| 6,623,053 | B1 | 9/2003 | Hwang | |
| 6,807,833 | B1 * | 10/2004 | Huang et al. | 70/107 |
| 6,860,129 | B2 * | 3/2005 | Eller et al. | 70/217 |
| 7,100,407 | B2 * | 9/2006 | Chen | 70/224 |
| 7,581,421 | B2 * | 9/2009 | Don et al. | 70/224 |
| 7,934,754 | B2 | 5/2011 | Mathachan | |
| 2002/0116965 | A1 * | 8/2002 | Bates et al. | 70/224 |
| 2009/0056392 | A1 * | 3/2009 | Brannaman et al. | 70/91 |
| 2012/0304712 | A1 * | 12/2012 | Chiou et al. | 70/145 |

* cited by examiner

*Primary Examiner* — Suzanne Barrett
(74) *Attorney, Agent, or Firm* — Hamre, Schumann, Mueller & Larson, P.C.

(57) ABSTRACT

In a cylinder lock assembly, a latch operating tube has an enlarged end portion extending into an outer drive tube disposed in an outer handle. A locking spindle is disposed in the latch operating tube and has a locking tongue extending radially and outwardly through the outer drive tube to interlock with an outer rose when the locking spindle is pressed by a push button to move to a locked state. A locking plate is sleeved around the locking spindle and has a radial locking part to engage a protrusion that projects radially and inwardly from an inner surface of the enlarged end portion so that the locking spindle is locked against movements to an unlocked state when the locking spindle is in its locked state.

11 Claims, 8 Drawing Sheets

PUSH-BUTTON TYPE CYLINDER LOCK ASSEMBLY

CROSS-REFERENCE TO RELATED APPLICATION

This application claims priority of Taiwanese Patent Application No. 100210018, filed on Jun. 2, 2011.

BACKGROUND OF THE INVENTION

1. Field of the Invention

The invention relates to a cylinder lock assembly, more particularly to a cylinder lock assembly having an inner lock unit with a push button, which can be pressed to place the cylinder lock assembly in a locked state.

2. Description of the Related Art

A cylinder lock assembly typically includes an inner lock unit provided with a push button or rotary button for operating a locking spindle that passes through a rectangular latch operating tube. When the locking spindle is operated through the push or rotary button, the cylinder lock assembly can be placed in a locked state. However, because the rotation of the rotary button is inconvenient for handicapped persons, push-button type cylinder lock assemblies are commonly used in public places. Various forms of cylinder lock assemblies having push-button type inner lock units have existed in the prior art. Nevertheless, the constructions thereof are complicated. Examples thereof are disclosed in U.S. Pat. Nos. 5,816,086, 6,623,053 and 7,934,754.

SUMMARY OF THE INVENTION

An object of the present invention is to provide a cylinder lock assembly having a push-button type inner lock unit, which has a simple construction.

According to one aspect of the invention, a cylinder lock assembly comprises: a latch unit; an outer lock unit which includes an outer rose, an outer handle, an outer drive tube, a latch operating tube, a locking spindle, and a locking plate; and an inner lock unit.

The outer drive tube is disposed rotatably in the outer rose and connected to the outer handle, the outer drive tube having an axially extending aperture. The latch operating tube is connected to the latch unit, and has an enlarged end portion extending into the outer drive tube opposite to the outer handle. The enlarged end portion has a surrounding wall, and a protrusion projecting inwardly and radially from the surrounding wall. The locking spindle is disposed axially in the latch operating tube and movable axially between a locked state and an unlocked state. The locking spindle has one end that is inserted into the surrounding wall and that has a locking tongue extending radially and outwardly through the aperture of the outer drive tube and movable axially within the aperture. The locking tongue is interlockable with the outer rose when the locking spindle is in the locked state. The locking plate is fixed to the locking spindle transversely of the outer drive tube and in proximity to the locking tongue. The locking plate has a radially extending locking part to engage the protrusion and to thereby lock the locking spindle against a movement to the unlocked state from the locked state when the locking spindle is in the locked state.

The inner lock unit includes a push button connected to another end of the locking spindle and operable to press and move axially the locking spindle from the unlocked state to the locked state.

According to another aspect of the invention, a cylinder lock assembly comprises an outer rose, an outer handle, an outer drive tube disposed rotatably within the outer rose and connected to the outer handle. The outer drive tube has an axially elongated aperture. A latch operating tube is connected to a latch unit, and has an enlarged end portion that extends into the outer drive tube opposite to the outer handle. The enlarged end portion has a surrounding wall, and a protrusion projecting inwardly and radially from an inner surface of the surrounding wall. A locking spindle extends movably in the latch operating tube and has one end that is inserted into the surrounding wall and that has a locking tongue extending radially and outwardly through the aperture of the outer drive tube and movable axially within the aperture. The locking tongue is interlockable with the outer rose when the locking spindle is moved from an unlocked state to a locked state. A locking plate is fixedly sleeved around the locking spindle in proximity to the locking tongue. The locking plate has a locking part extending radially to the inner surface of the surrounding wall. An inner handle has a push button that is connected to another end of the locking spindle. The push button is operable to press and move axially the locking spindle from the unlocked state to the locked state.

When the locking spindle is moved to the locked state, the locking part of the locking plate engages the protrusion on the surrounding wall to thereby prevent the locking spindle from returning to the unlocked state from the locked state. The protrusion is movable away from the locking part of the locking plate to permit the locking spindle to return to the unlocked state when the latch operating tube is rotated relative to the locking spindle and the locking plate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
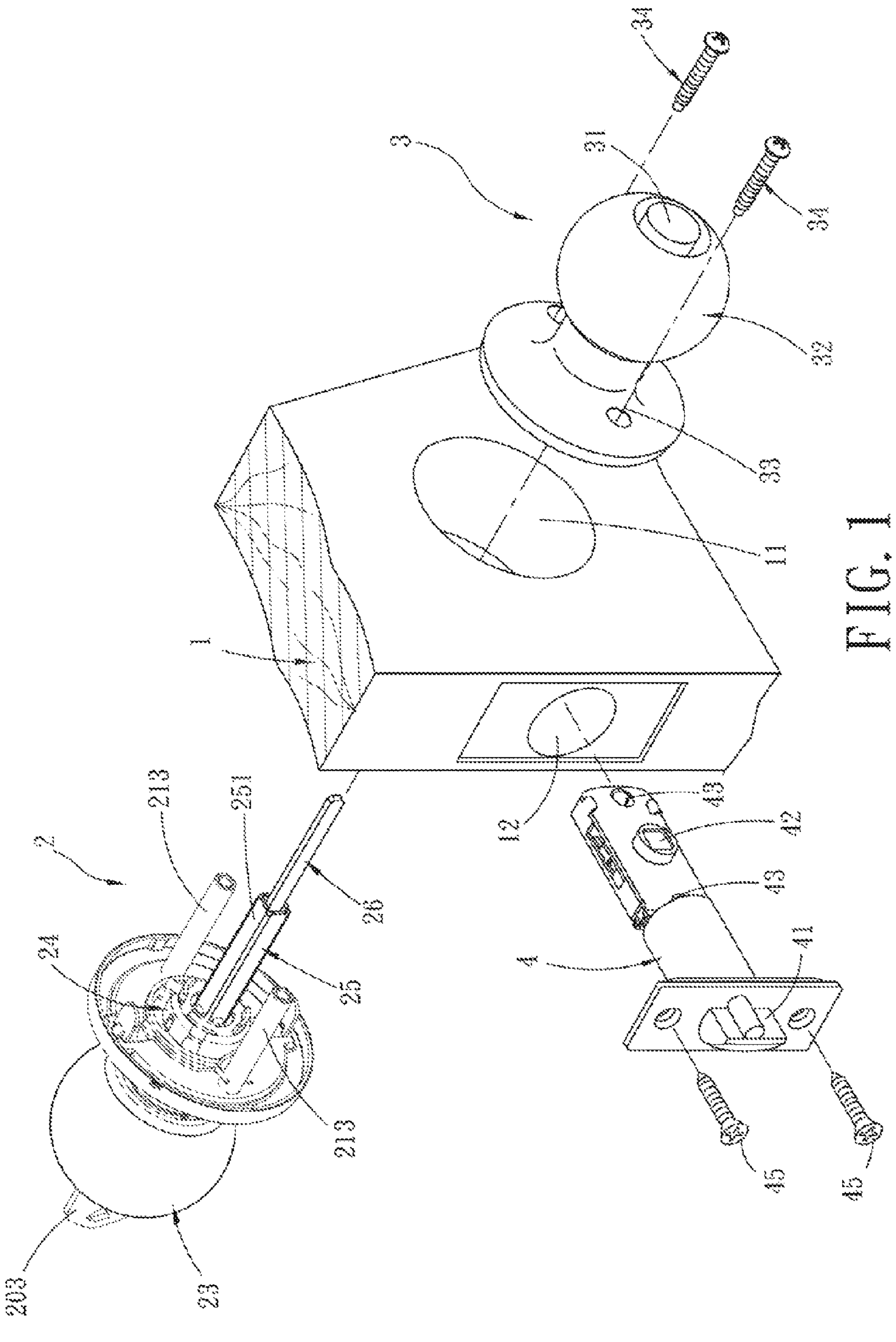
FIG. 1 is an exploded perspective view of a cylinder lock assembly according to the present invention.
Figure 2:
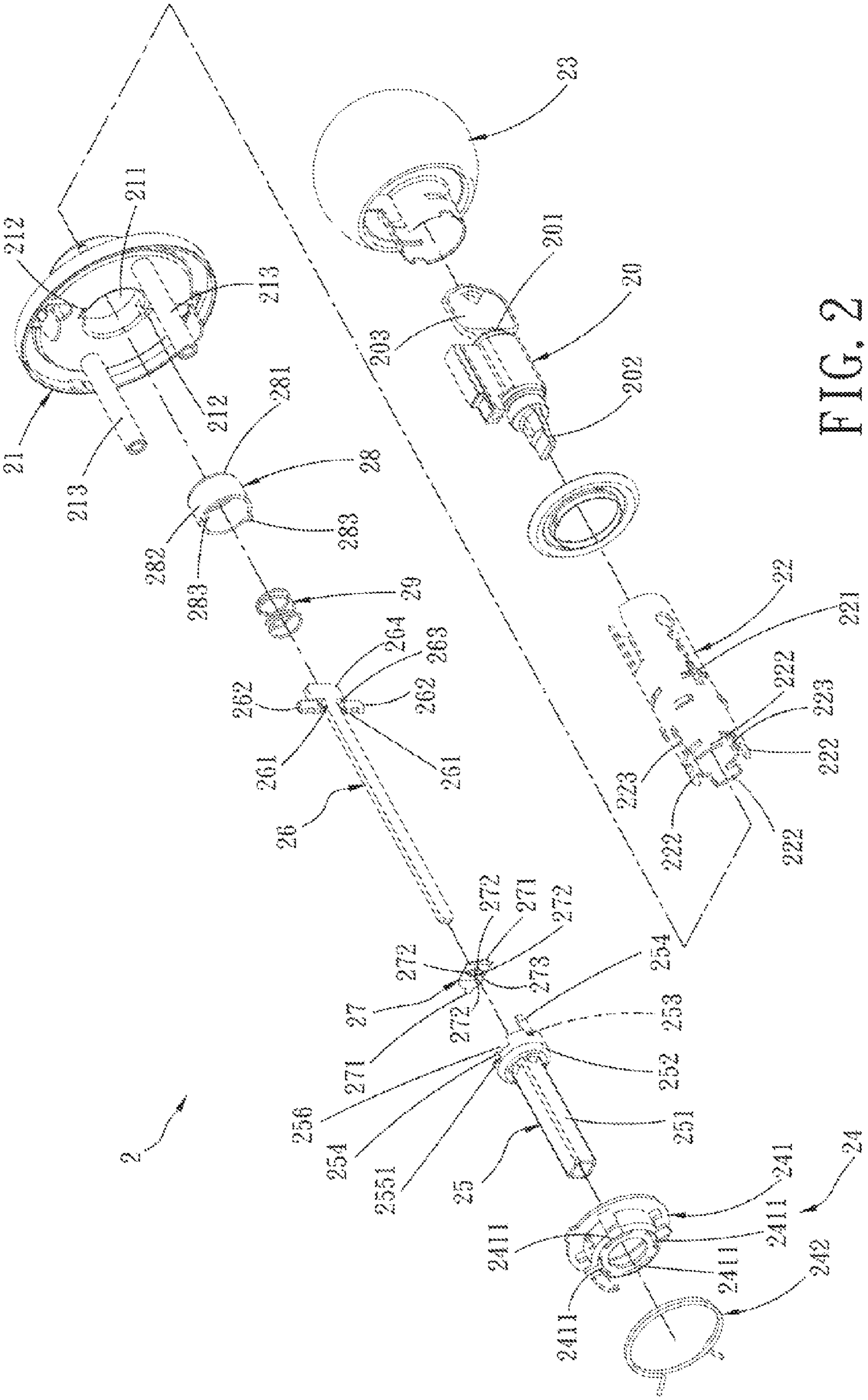
FIG. 2 is another exploded perspective view showing the cylinder lock assembly in more detail.
Figure 5:
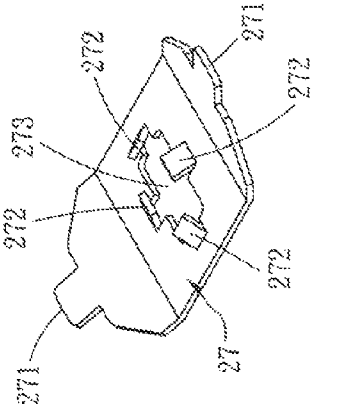
FIG. 5 is a perspective view showing a locking plate of the cylinder lock assembly.
Figure 4:
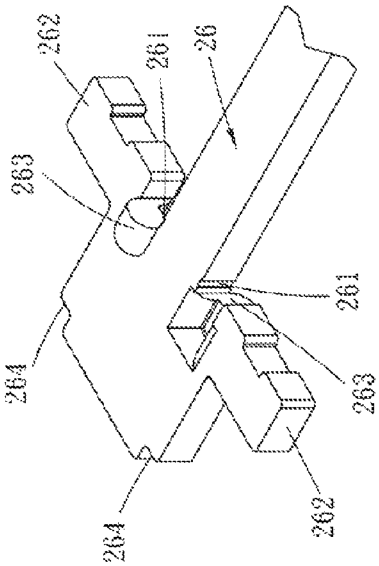
FIG. 4 is a fragmentary perspective view showing a locking spindle of the cylinder lock assembly.
Figure 3:
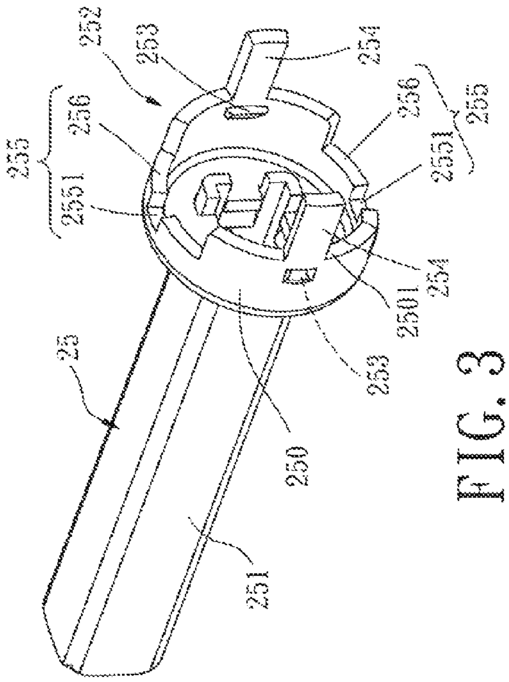
FIG. 3 is a perspective view showing a latch operating tube of the cylinder lock assembly.

Referring to FIGS. 1 to 4, a cylinder lock assembly according to a preferred embodiment of the present invention is mountable on a door panel 1 and includes an outer lock unit 2, an inner lock unit 3 and a latch unit 4.

The outer lock unit 2 includes the following components:

An outer rose 21 has an axial hole 211, two angularly spaced apart recesses 212 communicated with the axial hole 211, and a pair of internally threaded mounting posts 213.

An outer drive tube 22 is disposed axially and movably in the outer rose 21 and has one end portion that is inserted into an outer handle 23 and that has an engaging element 221 to engage the outer handle 23. A key-operated lock 20 is disposed in the outer end portion of the outer drive tube 22, and has a lock core 201 operable through a key 203 to rotate an actuator plate 202. Another end portion of the outer drive tube 22 has four angularly spaced apart tabs 222 respectively inserted into four slots 2411 formed in a spring retainer 241 of a returning mechanism 24. The spring retainer 241 carries a torsion spring 242 which functions to return the outer drive tube 22 and the outer handle 23 after the outer handle 23 is operated to rotate a predetermined angle. Two angularly spaced apart apertures 223 are formed in the outer drive tube 22 in proximity to the tabs 222 and are elongated axially.

A latch operating tube 25 has a tube section 251 of square cross section and connected to an enlarged end portion 252. The enlarged end portion 252 has a surrounding wall 250, two angularly spaced apart protrusions 253 that protrude inwardly from an inner surface of the surrounding wall 250 proximate to an annular free end 2501 of the surrounding wall 250, two angularly spaced apart prongs 259 that projects axially from the annular free end 2501, and two angularly spaced apart notches 255 indented from the annular free end 2501. Each notch 255 has a shallow notch portion 256 and a deep notch portion 2551 that is indented from a bottom of the shallow notch portion 256.

A locking spindle 26 extends through the latch operating tube 25, and has one end extending into the surrounding wall 250 of the enlarged end portion 252. The locking spindle 26 is formed with spring bearing parts 264, two locking tongues 262 that extend radially and oppositely, a pair of angularly spaced interlocking grooves 261 formed respectively in the locking tongues 262, and a pair of stop elements 263 formed respectively on the locking tongues 262 adjacent the interlocking grooves 261.

The locking spindle 26 is movable axially between an unlocked state (not pressed by a push button 31) and a locked state (pressed by the push button 31). The locking tongues 262 are movable axially and respectively in the apertures 223 of the outer drive tube 22 and extend radially and outwardly through the apertures 223 for interlocking with the recesses 212 of the outer rose 21. The locking tongues 262 interlock with the outer rose 21 when the locking spindle 26 is in the locked state.

A locking plate 27 is formed as a resilient plate which is transverse to the outer drive tube 22 and is attached fixedly to the locking spindle 26 in proximity to the locking tongues 262. The locking plate 27 includes two radially extending locking parts 271, a hole 273 for extension of the locking spindle 26, and multiple resilient bent tabs 272 projecting inclinedly in proximity to the hole 273. When the locking plate 27 is sleeved around the locking spindle 26, one pair of the bent tabs 272 interlock with the interlocking grooves 261, thereby preventing the locking plate 27 from moving relative to the locking spindle 26. The stop elements 263 abut against and stabilize the locking plate 27, or to prevent vibration of the locking plate 27 relative to the locking spindle 26.

A transmission member 28 is a hollow body, which is received within the outer drive tube 22 between the key-operated lock 20 and the locking spindle 26. The transmission member 28 has a cylindrical wall 282 and an end wall 281. The end wall 281 has a passage hole 284 for passage of the actuator plate 202 of the key-operated lock 20. The end wall 281 is in abutment with the engaging element 221 of the outer drive tube 22. The cylindrical wall 282 of the transmission member 28 has two pushers 283. When the transmission member 28 is rotated by the actuator plate 202, the pushers 283 push the prongs 254 of the latch operating tube 25, respectively.

A biasing spring 29 is disposed inside the transmission member 28 between the end wall 281 and the locking spindle 26, and has one end connected to the spring bearing parts 264 of the locking spindle 26. Another end of the biasing spring 29 abuts against the end wall 281 to bias the locking spindle 26.

Figure 8:
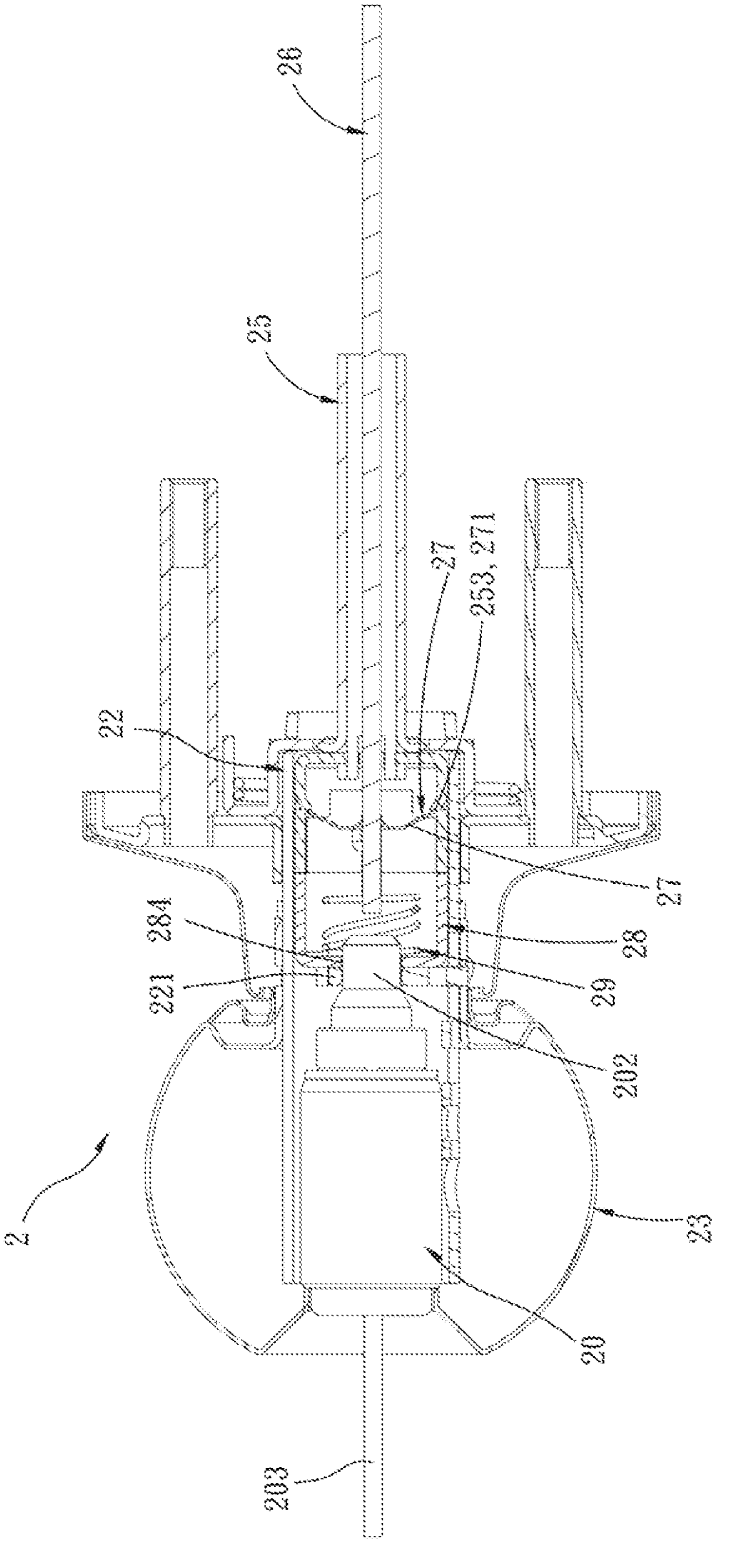
FIG. 8 is the same view as FIG. 6 but showing that the locking spindle is pressed.
Figure 9:
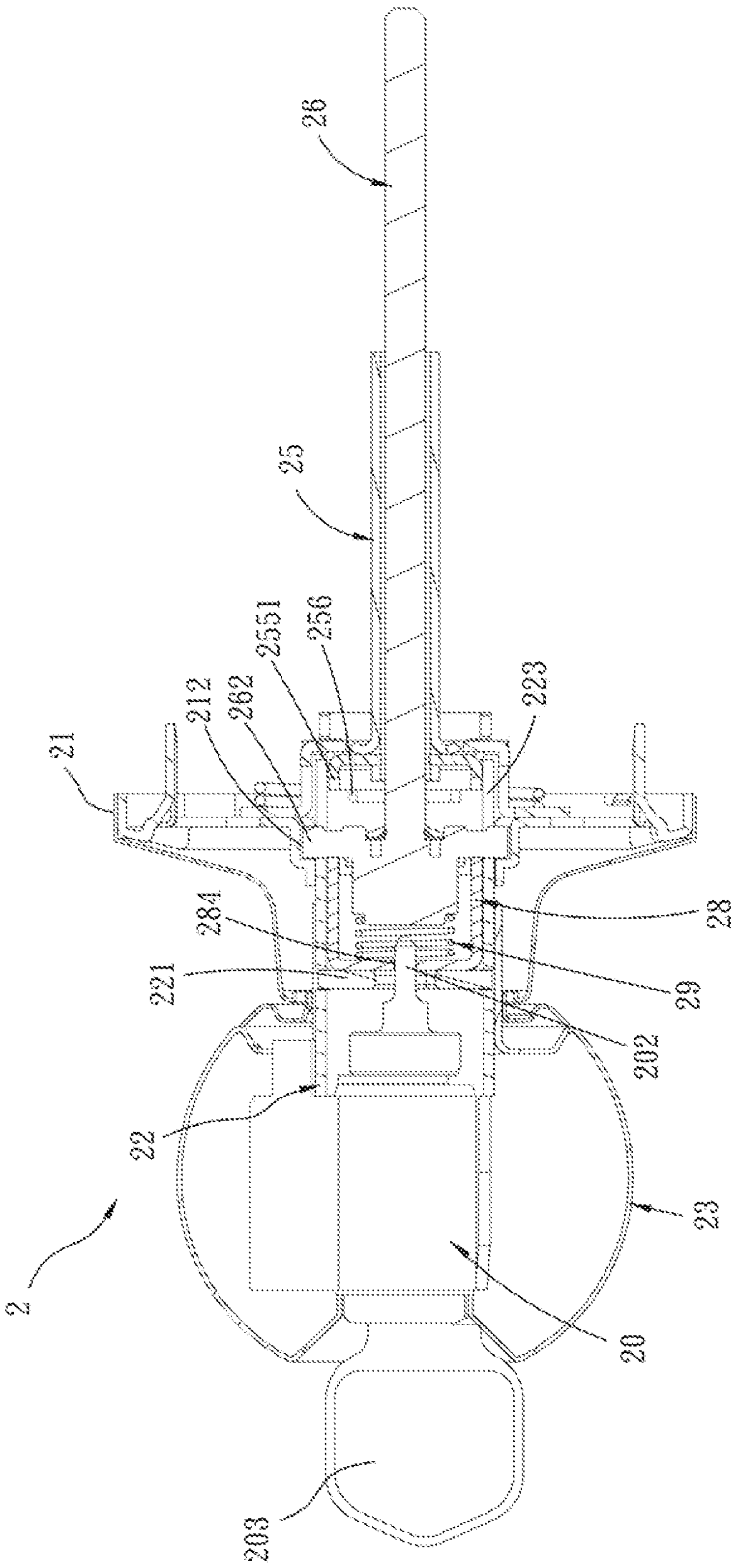
FIG. 9 is the same view as FIG. 7 but showing that the locking spindle is pressed.
Figure 11:
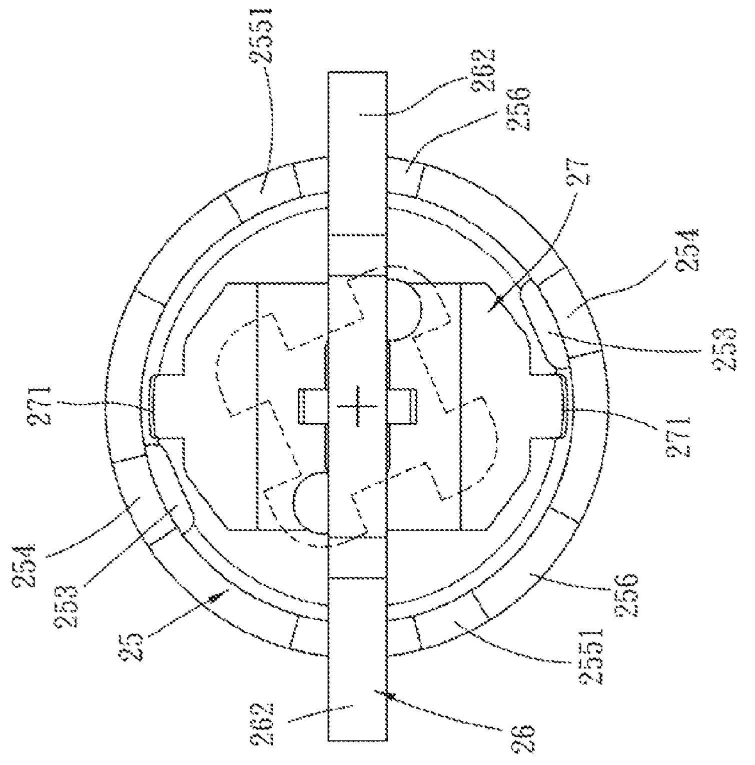
FIG. 11 is the same view as FIG. 10 but illustrating that a protrusion of the latch operating tube is moved away from a locking part of the locking plate.
Figure 10:
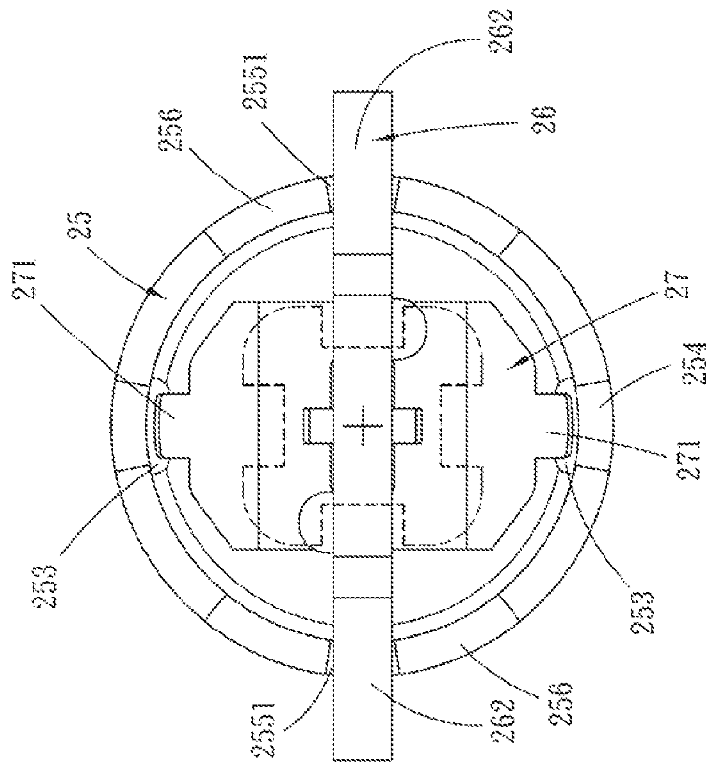
FIG. 10 is a plan view illustrating the locking spindle, the locking plate and the latch operating tube.

Referring to FIGS. 8 and 9, when the locking spindle 26 is moved to the locked state, the locking parts 271 respectively engage the protrusions 253 on the surrounding wall 250 to thereby prevent the locking spindle 26 from returning to the unlocked state from the lock state. Referring to FIGS. 10 and 11, the protrusions 253 are movable away from the locking parts 271 to permit the locking spindle 26 to return to the unlocked state when the latch operating tube 25 is rotated relative to the locking spindle 26 and the locking plate 27.

Referring back to FIGS. 3 to 9, the protrusions 253 are proximate to the annular free end 2501 of the surrounding wall 250, and are spaced angularly from the notches 255. The locking tongues 262 are located outwardly of the annular free end 2501 and interlock with the recesses 212 of the outer rose 21 when the locking parts 271 engage the respective protrusions 253. The locking tongues 262 are moved into the respective shallow notch portions 256 by the biasing spring 29 when the latch operating tube 25 is rotated to move the protrusions 253 away from the locking parts 271 (see FIG. 11). The locking tongues 262 are received in the respective deep notch portions 2551 when the locking spindle 26 is in the unlocked state.

Figure 6:
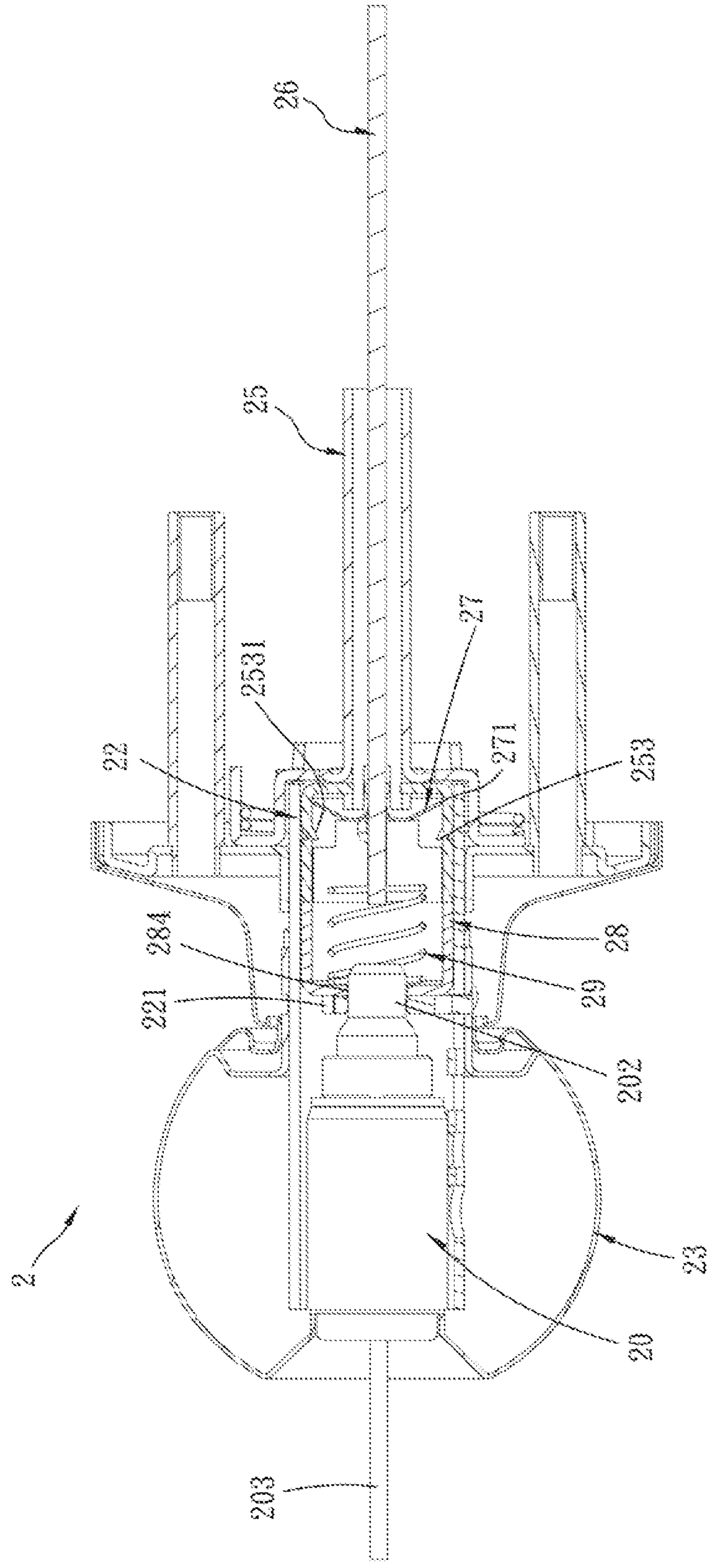
FIG. 6 is a sectional view showing an outer lock unit of the cylinder lock assembly.
Figure 7:
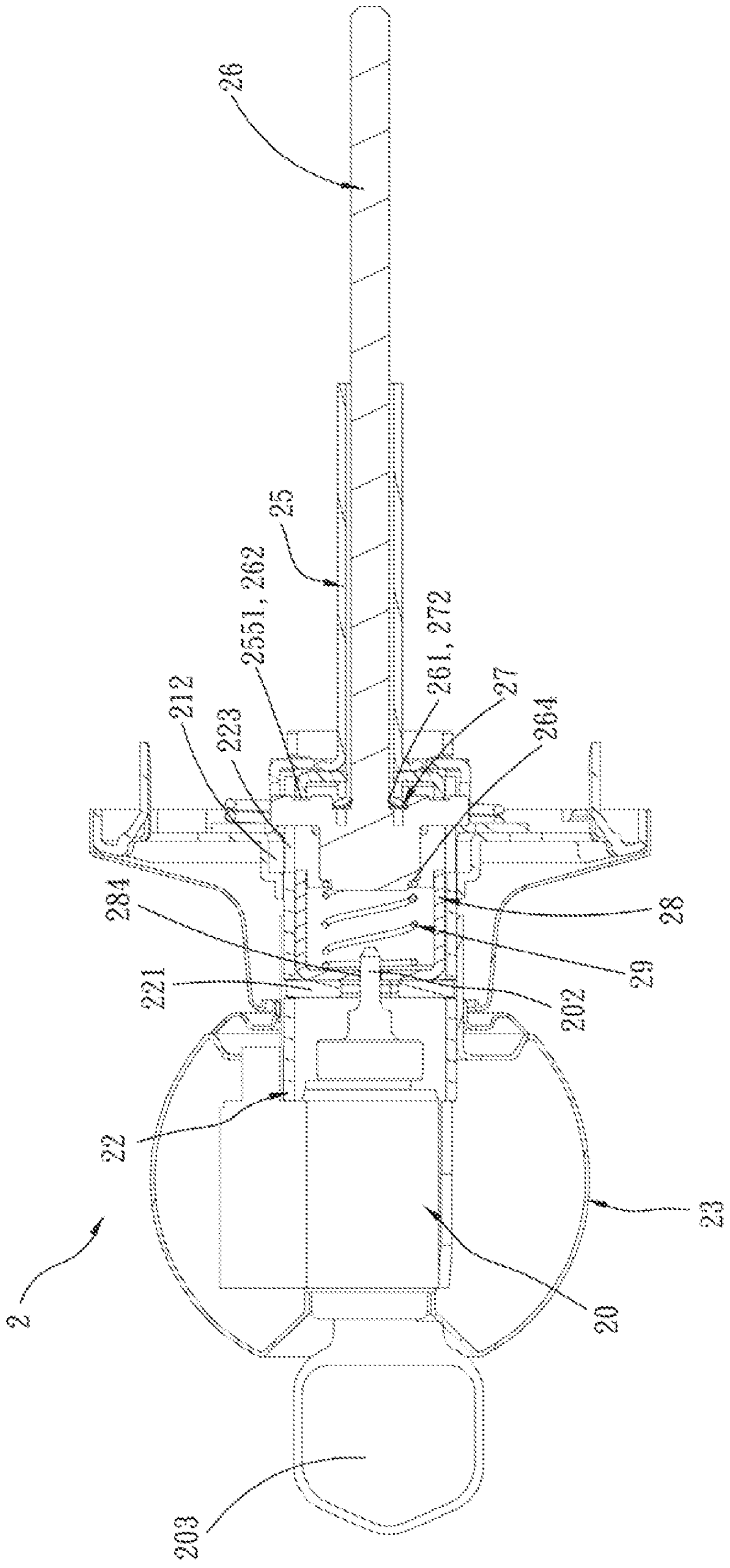
FIG. 7 is another sectional view showing the outer lock unit.

Preferably, the protrusions 253 are substantially wedge-shaped and have inclined surfaces 2531 (FIG. 6). The locking parts 271 contact resiliently and slidingly the inner surface of the surrounding wall 250 and are slidable over the inclined surfaces 2531 to come into engagement with the protrusions 253 when the locking spindle 26 moves to the locked state from the unlocked state.

The inner lock unit 3 includes a push button 31 disposed within an inner handle 32 for connection with the locking spindle 26. The structure of the inner lock unit 3 is known and is not detailed hereinafter.

The latch unit 4 is mounted within a latch mounting hole 12 of the door panel 1 by virtue of screws 45, and includes a rectangular hole 42 for insertion of the latch operating tube 25, and two holes 43 for insertion the mounting posts 213. The tube section 251 of the latch operating tube 25 extends through a lock mounting hole 11 in the door panel 1 and the rectangular hole 42 and connected to the inner lock unit 3. The latch unit 4 can thus be actuated by the latch operating tube 25 to retract a latch 41. The mounting posts 213 of the outer rose 21 are arranged to pass through the lock mounting hole 11 in the door panel 1 and the holes 43 in the latch unit 4, and are connected threadedly and respectively to two screws 34 extending through two apertures 33 (only one is shown in FIG. 1) of the inner lock unit 3. The outer and inner lock units 2, 3 and the latch unit 4 are therefore firmly attached to the door panel 1, and the locking spindle 26 is connected to the push button 31.

Referring once again to FIGS. 1 and 6 to 9, when the push button 31 is pressed, the locking spindle 26 is moved axially from an unlocked state (FIGS. 6 and 7) to a locked state (FIGS. 8 and 9). Accordingly, the two locking parts 271 of the locking plate 27 slide past the inclined surfaces 2531 of the respective protrusions 253 of the latch operating tube 25 so as to come into engagement with the protrusions 253. Furthermore, the locking tongues 262 of the locking spindle 26, which slide axially within the respective apertures 223 in the outer drive tube 22, move from the respective deep notch portions 2551 into the respective recesses 212 of the outer rose 21. As a result, the outer drive tube 22 is locked against rotational movements relative to the outer rose 21, the outer handle 23 cannot be rotated, and the outer lock unit 2 is in a locked state.

The outer lock unit 2 may be unlocked by using the key 203 and by rotating the inner handle 32. Referring to FIGS. 1, 6 to 11, when the inner handle 32 is rotated, the rotation of the inner handle 32 is transmitted to the latch operating tube 25 so that the protrusions 253 thereof are moved angularly away from the respective locking parts 271, i.e., from an engaging position shown in FIG. 10 to a non-engaging position shown in FIG. 11. At this state, the locking spindle 26 is moved from its locked state (FIGS. 8 & 9) to its unlocked state (FIGS. 6 & 7) by the action of the biasing spring 29. Accordingly, the locking tongues 262 of the locking spindle 26, which slide within the respective apertures 223 of the outer drive tube 22, are moved from the respective recesses 212 of the outer rose 21 and into the respective shallow notch portions 256 of the latch operating tube 25. After the inner handle 32 is returned to its original position by a torsion spring (not shown) of the inner lock unit 3, the latch operating tube 25 is returned to its original state so that the locking tongues 262 are returned to the deep notch portions 2551. The outer and inner lock units 2 and 3 are therefore unlocked.

Alternatively, when the key 203 is used to operate the lock core 201, the actuator plate 202 is rotated, the transmission member 28 moves idly an angle and then pushes the prongs 254 using the pushers 283, thereby rotating the latch operating tube 25 a predetermined angle so that the protrusions 253 thereof are moved away from the respective locking parts 271 of the locking plate 27. The outer and inner lock units 2 and 3 can therefore be unlocked as described hereinbefore.

While the present invention has been described in connection with what is considered the most practical and preferred embodiments, it is understood that this invention is not limited to the disclosed embodiment but is intended to cover various arrangements included within the spirit and scope of the broadest interpretation so as to encompass all such modifications and equivalent arrangements.

What is claimed is:

1. A cylinder lock assembly comprising:

a latch unit;

an outer lock unit which includes an outer rose, an outer handle, an outer drive tube, a latch operating tube, a locking spindle and a locking plate; and an inner lock unit;

said outer drive tube being disposed rotatably in said outer rose and connected to said outer handle, said outer drive tube having a pair of axially extending apertures that are opposite to each other;

said latch operating tube being connected to said latch unit, and having an enlarged end portion extending into said outer drive tube opposite to said outer handle, said enlarged end portion having a surrounding wall, and a protrusion projecting inwardly and radially from said surrounding wall;

said locking spindle disposed axially in said latch operating tube and movable axially between a locked state and an unlocked state, said locking spindle having one end that is inserted into said surrounding wall and that has a pair of opposite locking tongues, extending radially and outwardly through respective said apertures of said outer drive tube, and movable axially within said apertures, said locking tongues being interlockable with said outer rose when said locking spindle is in said locked state;

said locking plate being fixed to said locking spindle, said locking plate being positioned transversely relatively to said outer drive tube and sleeved around said locking spindle in abutment with said locking tongues, said locking plate having a hole to permit said locking spindle to extend therethrough, and a radially extending locking part to engage said protrusion and to thereby lock said locking spindle against a movement to said unlocked state from said locked state when said locking spindle is in said locked state; and said inner lock unit including a push button connected to another end of said locking spindle and operable to press and move axially said locking spindle from said unlocked state to said locked state.

2. The cylinder lock assembly of claim 1, wherein said locking plate further has resilient bent tabs projecting inclinedly in proximity to said hole and interlocked with said locking spindle.

3. The cylinder lock assembly of claim 2, wherein said locking spindle has a pair of angularly spaced interlocking grooves to engage said bent tabs.

4. The cylinder lock assembly of claim 3, wherein said locking spindle further has a pair of stop elements formed respectively on said locking tongues to abut against said locking plate.

5. The cylinder lock assembly of claim 1, wherein said outer drive tube has two angularly spaced apertures that are elongated axially, said locking tongues of said locking spindle extending radially and outwardly through said apertures and being movable axially within said apertures, respectively.

6. The cylinder lock assembly of claim 5, wherein said outer rose has two angularly spaced recesses to respectively interlock with said locking tongues when said locking spindle is in the locked state.

7. The cylinder lock assembly of claim 1, wherein said enlarged end portion of said latch operating tube has a pair of said protrusions projecting inwardly and oppositely from said surrounding wall, said locking plate having a pair of said locking parts that are formed respectively at two opposite ends of said locking plate and that contact slidably and resiliently an inner surface of said surrounding wall, said protrusions being substantially wedge-shaped and having inclined surfaces, wherein when said locking spindle moves from said unlocked state to said locked state, said locking parts respectively slide over said inclined surfaces to come into engagement with said protrusions respectively.

8. The cylinder lock assembly of claim 1, further comprising a key-operated lock and a transmission member, both of which are disposed within said outer drive tube, said enlarged end portion further having two angularly spaced prongs projecting axially from an annular free end of said surrounding wall, said transmission member driving said prongs when said key-operated lock is operated by a key.

9. The cylinder lock assembly of claim 8, further comprising a biasing spring to bias said locking spindle to move to said unlocked state from said locked state, said transmission member being configured as a hollow body that is disposed in said outer drive tube between said enlarged end portion and said key-operated lock, said biasing spring being disposed in said hollow body and having one end connected to said locking spindle.

10. A cylinder lock assembly comprising:

an outer rose;

an outer handle;

an outer drive tube disposed rotatably within said outer rose and connected to said outer handle, said outer drive tube having an axially elongated aperture;

a latch operating tube connected to a latch unit, and having an enlarged end portion that extends into said outer drive tube opposite to said outer handle, said enlarged end portion having a surrounding wall, and a protrusion projecting inwardly and radially from an inner surface of said surrounding wall;

a locking spindle extending movably in said latch operating tube and having one end that is inserted into said surrounding wall and that has a locking tongue extending radially and outwardly through said aperture of said outer drive tube and movable axially within said aperture, said locking tongue being interlockable with said outer rose when said locking spindle is moved from an unlocked state to a locked state;

a locking plate fixedly sleeved around said locking spindle in proximity to said locking tongue, said locking plate having a locking part extending radially to said inner surface of said surrounding wall;

an inner handle having a push button that is connected to another end of said locking spindle, said push button being operable to press and move axially said locking spindle from said unlocked state to said locked state; and a biasing spring to bias said locking spindle to move to said unlocked state when said protrusion is moved away from said locking part;

wherein, when said locking spindle is moved to said locked state, said locking part of said locking plate engages said protrusion on said surrounding wall to thereby prevent said locking spindle from returning to said unlocked state from said locked state;

wherein said protrusion is movable away from said locking part of said locking plate to permit said locking spindle to return to said unlocked state when said latch operating tube is rotated relative to said locking spindle and said locking plate;

wherein said protrusion is proximate to an annular free end of said surrounding wall, said enlarged end portion further having a notch that is indented from said annular free end of said surrounding wall and that is spaced angularly from said protrusion, said locking tongue being located outwardly of said annular free end and interlocking with said outer rose when said locking part of said locking plate engages said protrusion, said locking tongue being moved into said notch by said biasing spring when said latch operating tube is rotated to move said protrusion away from said locking part; and wherein said notch includes a shallow notch portion proximate to said annular free end, and a deep notch portion that is indented form a bottom of said shallow notch portion, said locking tongue being received in said deep notch portion when said locking spindle is in said unlocked state.

11. A cylinder lock assembly comprising:

an outer rose;

an outer handle;

an outer drive tube disposed rotatably within said outer rose and connected to said outer handle, said outer drive tube having an axially elongated aperture;

a latch operating tube connected to a latch unit, and having an enlarged end portion that extends into said outer drive tube opposite to said outer handle, said enlarged end portion having a surrounding wall, and a protrusion projecting inwardly and radially from an inner surface of said surrounding wall;

a locking spindle extending movably in said latch operating tube and having one end that is inserted into said surrounding wall and that has a locking tongue extending radially and outwardly through said aperture of said outer drive tube and movable axially within said aperture, said locking tongue being interlockable with said outer rose when said locking spindle is moved from an unlocked state to a locked state;

a locking plate fixedly sleeved around said locking spindle in proximity to said locking tongue, said locking plate having a locking part extending radially to said inner surface of said surrounding wall; and an inner handle having a push button that is connected to another end of said locking spindle, said push button being operable to press and move axially said locking spindle from said unlocked state to said locked state;

wherein, when said locking spindle is moved to said locked state, said locking part of said locking plate engages said protrusion on said surrounding wall to thereby prevent said locking spindle from returning to said unlocked state from said locked state;

wherein said protrusion is movable away from said locking part of said locking plate to permit said locking spindle to return to said unlocked state when said latch operating tube is rotated relative to said locking spindle and said locking plate; and wherein said protrusion is substantially wedge-shaped and has an inclined surface, said locking part contacting resiliently and slidingly said inner surface of said surrounding wall and being slidable over said inclined surface to come into engagement with said protrusion when said locking spindle moves to said locked state.

* * * * *